United States Patent [19]

Plante

[11] 4,159,591
[45] Jul. 3, 1979

[54] PANELS FOR LOBSTER TRAPS

[76] Inventor: Emile A. P. Plante, 74 Badgers Island, Kittery, Me. 03904

[21] Appl. No.: 839,126

[22] Filed: Oct. 3, 1977

[51] Int. Cl.² .............................................. A01K 69/08
[52] U.S. Cl. .................................................... 43/100
[58] Field of Search .................................... 43/100, 65

[56] References Cited

U.S. PATENT DOCUMENTS 3,497,989  3/1970  Schultz ................................. 43/100

FOREIGN PATENT DOCUMENTS 747613  12/1966  Canada ...................................... 43/100
1421579  11/1965  France ....................................... 43/100
2331281   6/1977  France ....................................... 43/100

Primary Examiner—Jimmy C. Peters
Attorney, Agent, or Firm—John C. MacNab

[57] ABSTRACT

A lobster trap having top, bottom sides and ends forming a rectangular box like structure. The top, bottom, one end and one side wall each being made of spaced laths. The other end wall may be made of reticulated wire mesh having an entrance opening therein. The other side wall has laths and a detachable plastic panel which is the subject matter of this invention. The panel is constructed of dark blue or black rigid water resistant plastic material and have narrow rectangular slots therethrough adjacent the top edge and bottom edge. One of the panels has two large rectangular openings therethrough to allow undersized lobsters and crabs to escape from the trap. An alternate panel has relatively large circular vents therethrough to permit undersized lobsters to escape but not crabs.

2 Claims, 7 Drawing Figures

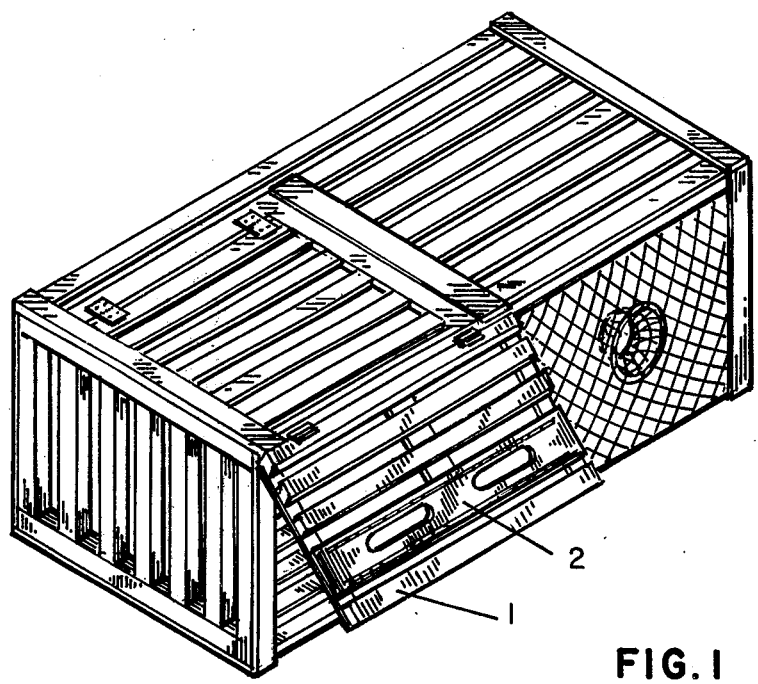
FIG.1
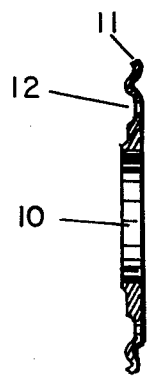
FIG. 3   FIG.4
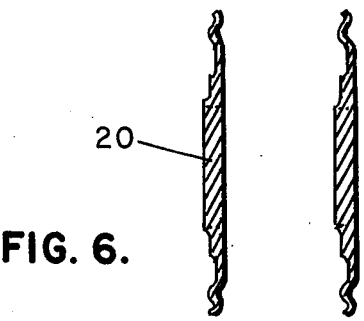
FIG. 6.   FIG. 7

PANELS FOR LOBSTER TRAPS

My invention relates to lobster and crab traps, more particularly to panels or plates for lobster and crab traps.

One of the objects of my invention is to so modify a lobster trap to permit undersized lobsters and if desired crabs to escape from the traps.

A further object of my invention is the elimination of labor and time spent in removing manually the undersized lobsters from lobster traps.

A further object is to provide a durable panel for lobster traps.

A further object is to provide a panel for lobster traps which allows undersized lobsters but not crabs to escape from the trap.

FIG. 1 shows a lobster trap with the panel attached thereon.

FIG. 3 illustrates cross-section on line 3—3 of FIG. 2.

FIG. 4 is a cross-section on the line 4—4.

FIG. 6 is a cross-sectional view taken on the line 6—6 of FIG. 5.

FIG. 7 is a sectional view taken on the plane 7—7 of FIG. 5.

As shown in FIG. 1, the lobster trap, in normal usage at present, constitutes a rectangular box like structure having a bottom, top, sides, and one end wall each of which is made up of spaced hard wood laths and the open end is a screen like rectangular pyramid shaped element extending into the box like structure and having its inner end open to form an entrance passage into the trap. One of the side walls is hinged or removably attached to the box like structure to allow removal of the trapped lobsters and or crabs.

The hinged or removable side wall of my trap indicated at (1) in FIG. 1 shows one of my panels (2) attached to the lower end of the side wall (1) after two of the lower laths of this side wall (1) have been removed.

Figure 2:
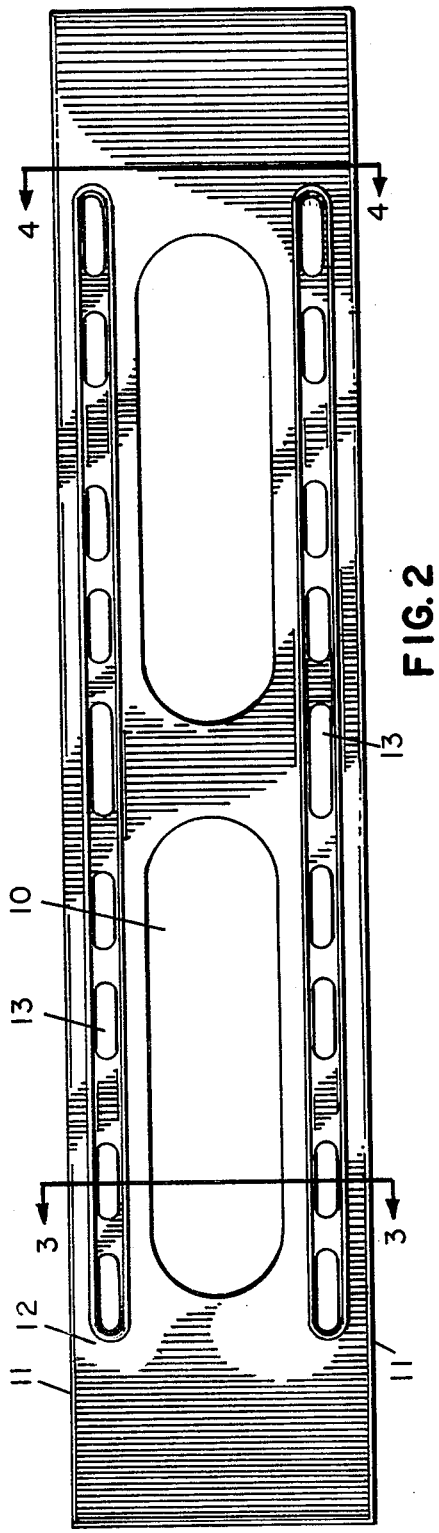
FIG. 2 shows front view of one of the panels.
Figure 5:
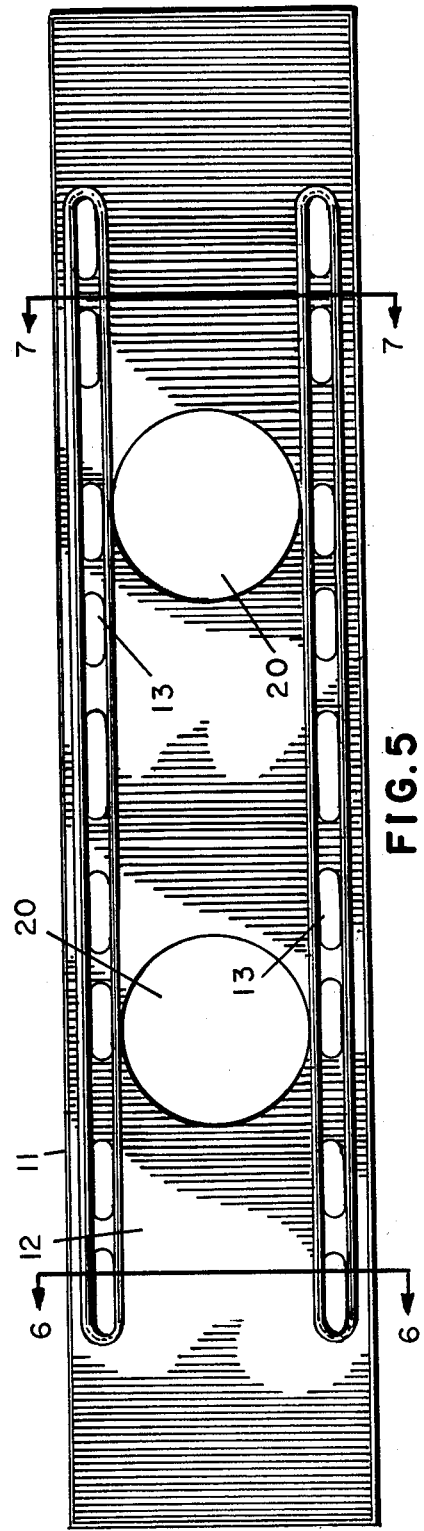
FIG. 5 shows a front view of a different panel.

An enlarged view of panel 2, illustrated in FIG. 2 shows this panel to have two large rectangular openings or vents (10) therethrough. These openings (10) are approximately 6 to 6¼ inches long and 1¾ to 1⅞ inches wide and have rounded ends. Such openings permit undersized lobsters and crabs to escape from the trap.

My panels are constructed of very durable gray or black plastic material such as polyethylene or polypropanol which is resistant to salt water. They are rigid and approximately ⅛ inch in thickness, about 4 inches in width and from 20 to 22 inches in length. Each panel has two reinforcing ribs (11) and (12) adjacent their outter longitudinal edges. The inner ribs (12) have slot openings (13) therethrough to allow water to pass into and out of the trap. The ends of each panel are flat and plane and are attached to the trap by nails, screws or wire, not shown.

An alternate panel is made of the same material and design but has two or more spaced circular openings 20 therethrough. These openings are approximately 2¼ to 2⅜ inches in diameter and allow undersized lobsters but not crabs to escape from the trap.

It is noted that my panel is substantially rigid yet because of the nature of its material and size of the panel it may be flexed to bend and be wired to a curved trap as well as to a rectangular trap wall.

I claim:

1. A substantially elongated rigid rectangular panel for lobster and crab traps, said panel constructed of water resistant plastic material such as polyethylene and having two spaced rectangular vents therethrough with rounded ends, said vents being of the order of one and three quarters inches (1¾") to one and seven eights inches (1⅞") by six inches (6") and having semi-circular ends, the outer longitudinal edges of the panels having two reinforcing ribs adjacent said edges and spaced narrow slots extending through the ribs adjacent the said rectangular vents, said panels to be used to replace at least two of the lower laths of a conventional lobster trap or the lower side portion of a wire trap.

2. The structure as claimed in the above claim wherein the spaced rectangular vents are replaced by circular vents of approximately two and one quarter inches (2¼") to two and three eights inches (2⅜") in diameter.

* * * * *